United States Patent [19]

Lindner et al.

[11] Patent Number: 4,461,868

[45] Date of Patent: Jul. 24, 1984

[54] MIXTURE OF A THERMOPLASTIC POLYMER OF AN ALKYL METHACRYLATE AND A GRAFT POLYMER OF METHYL METHACRYLATE ONTO CROSSLINKED ALKYL ACRYLATE RUBBER

[75] Inventors: Christian Lindner, Cologne; Karl-Heinz Ott; Horst Peters, both of Leverkusen; Josef Buekers, Krefeld, all of Fed. Rep. of Germany; Dieter Neuray, New Martinsville, W. Va.

[73] Assignee: Bayer Aktiengesellschaft, Leverkusen-Bayerwerk, Fed. Rep. of Germany

[21] Appl. No.: 473,756

[22] Filed: Mar. 9, 1983

[30] Foreign Application Priority Data

Mar. 20, 1982 [DE] Fed. Rep. of Germany ....... 3210284

[51] Int. Cl.³ .................... C08L 69/00; C08L 51/04
[52] U.S. Cl. ........................................ 525/67; 525/80; 525/87; 525/902
[58] Field of Search ............ 525/67, 901, 902, 80

[56] References Cited

U.S. PATENT DOCUMENTS 3,988,389 10/1976 Margotte et al. ...................... 525/67
4,299,928 11/1981 Witman ................................. 525/67
4,393,172 7/1983 Lindner et al. ...................... 525/310

FOREIGN PATENT DOCUMENTS 1182807 3/1970 United Kingdom ............ 260/880 R

Primary Examiner—Theodore E. Pertilla
Attorney, Agent, or Firm—Connolly and Hutz

[57] ABSTRACT

The present invention relates to mixtures comprising (a) thermoplastic aromatic polycarbonates having $\overline{M}w$ (weight average molecular weight) of 10,000 to 200,000, preferably 20,000 to 80,000 (determined by measuring the relative viscosity $\eta rel$ in $CH_2Cl_2$ at 25° C. and a concentration of 0,5 g per 100 ml $CH_2Cl_2$ (b) thermoplastic polymers of $C_1$-$C_4$—alkyl methacrylates having $\overline{M}w$ (weight average moleculr weight) of 10,000 to 1,000,000 (measured in dimethylformamide at 25° C.) and (c) particulate graft polymers of methyl methacrylate onto a particulate, highly crosslinked alkyl acrylate-rubber which can optionally also contain a crosslinked diene rubber as an inner core, as well as to thermoplastic moulding compositions based on thermoplastic ABS resins or thermoplastic SAN resins which contain the three-component mixture (a)+(b)+(c).

8 Claims, No Drawings

MIXTURE OF A THERMOPLASTIC POLYMER OF AN ALKYL METHACRYLATE AND A GRAFT POLYMER OF METHYL METHACRYLATE ONTO CROSSLINKED ALKYL ACRYLATE RUBBER

The present invention relates to mixtures comprising
(a) thermoplastic aromatic polycarbonates having $\overline{M}w$ (weight average molecular weight) of 10,000 to 200,000, preferably 20,000 to 80,000 (determined by measuring the relative viscosity $\eta$ rel in $CH_2Cl_2$ at 25° C. and a concentration of 0,5 g per 100 ml $CH_2Cl$
(b) thermoplastic polymers of $C_1-C_4$-alkyl methacrylates having $\overline{M}w$ (weight average molecular weight) of 10,000 to 1,000,000 (measured in dimethylformamide at 25° C.) and
(c) particulate graft polymers of methyl methacrylate onto a particulate, highly crosslinked alkyl acrylate-rubber which can optionally also contain a crosslinked diene rubber as an inner core.

By mixing melts of the polycarbonate and of polymethacrylates, moulding composition are obtained which show clear signs of incompatability, thereby having an adverse effect on the mechanical properties of mouldings produced therefrom and on the nature of their surfaces; this effect is utilised, for example, in Japanese Patent Publication No. 16,063/72: in this patent application, polycarbonates having a nacreous lustre (that is to say, of a surface of non-homogeneous nature) are obtained by mixing them with polymethylmethacrylate; although a surface nature of this type is of interest for some applications, in the thermoplastics sector, which is the most important in terms of amount, mouldings with a homogeneous, smooth surface are required. If mixtures of a polycarbonate and methyl methacrylate polymer with a smooth surface are to be produced, this is only possible if methacrylate polymers having a relatively low molecular weight and containing from 10 to 25% of incorporated foreign monomer are employed; such improved polycarbonate mixtures are described in DOS (German Published Specification) No. 2,264,268.

British Pat. No. 1,182,807 states that the properties of polycarbonate/polymethylmethacrylate mixtures may be improved by mixing them with rubber-like polymers, such as, for example, butadiene copolymers, butadiene graft polymers or alkyl acrylate copolymers (such as noncrosslinked methyl methacrylate/ethyl acrylate copolymers or crosslinked polyacrylate rubbers); however, graft polymers of vinyl monomers onto crosslinked acrylate rubbers are not used in this case. The moulding compositions described here (in British Pat. No. 1,182,807) represent polymethacrylates having improved dimensional stability under heat: however, the moulding compositions possess only low notched impact strength, similarly to polymethacrylates themselves; although the butadiene rubbers employed in these moulding compositions improve their toughness, they however considerably reduce the ageing resistance of the moulding compositions.

Mixtures of various methyl methacrylate resins with polycarbonates (see U.S. Pat. No. 3,957,921), which combine a nacreous appearance with good impact strength, are also known.

Mixtures of polycarbonates with the most diverse graft polymers have also been known for a long time (see, for example, U.S. Pat. No. 3,130,177, U.S. Pat. No. 3,162,695, Japanese Patent Publication No. 11,496/67, U.S. Pat. No. 3,886,231, U.S. Pat. No. 3,663,471, Japanese Patent Publication No. 32,729/72, U.S. Pat. No. 3,655,824, U.S. Pat. No. 3,642,946, Japanese Patent Publication No. 41,424/72, DE-OS (German Published Specification) No. 2,264,104, U.S. Pat. No. 3,891,719 (Le A 14 617), U.S. Pat. No. 3,988,389 (Le A 14 751), Japanese Preliminary Published Application No. 630,57/75, U.S. Pat. No. 4,172,103 (Le A 15 024), U.S. Pat. No. 3,880,783 (Le A 15 108), U.S. Pat. No. 3,954,905 (Le A 15 106) and U.S. Pat. No. 3,947,524). In the case of U.S. Pat. No. 3,655,824, these mixtures can also be mixed with polymethylmethacrylate resin, but no further details are given in this connection concerning the amounts and the advantages to be obtained.

Mixtures of polycarbonates with two or more than two polymers are also known (see Japanese Preliminary Published Application No. 73/43,449 and No. 75/10,347., U.S. Pat. No. 3,873,641 (Le A 15 107), U.S. Pat. No. 4,148,842 and U.S. Pat. No. 4,260,693).

Mixtures of polycarbonates with elastomers based on alkyl acrylates or methylmethacrylates are also known (see. U.S. Pat. No. 3,742,088 and DE-OS (German Published Specification) No. 2,303,190).

Plasticiser-containing mixtures of polycarbonates with special acrylate and methacrylate copolymers are known (see PCT/U.S. Application No. 79/00,465=WO 80/00,153=European Laid-Open Application No. 16,124).

Polycarbonate-polyester mixtures with special acrylates are also known (see U.S. Pat. No. 4,257,937 and U.S. Pat. No. 4,264,487).

Also known are graft polymers or union polymers based on acrylates and containing polymethacrylates (see U.S. Pat. Nos. 3,808,180, 3,562,235 and DE-OS (German Published Specification No. 2,263,193), to which thermoplastic polymethylmethacrylates (see European Laid-Open Application No. 45,875 and U.S. Pat. No. 3,843,753) or polyalkyleneterephthalates (see U.S. Pat. No. 4,096,202) or thermoplastic polycarbonates (see U.S. Pat. No. 4,299,928) may also be admixed.

It has now been found that polycarbonate/poly-$C_1$-$C_4$-alkylmethacrylate mixtures having high ageing resistance and thermostability and with good natural colour, but also having high notched impact strength and homogeneous surfaces, can be prepared if they are admixed with special, particulate graft copolymers of essentially methyl methacrylate on crosslinked, particulate acrylate rubbers.

In the mixtures, polycarbonates according to component (a) are present in amounts from 83 to 30 parts by weight, preferably from 75 to 45 parts by weight; the polyalkylmethacrylates according to component (b) are present in amounts from 7 to 60 parts by weight, preferably from 10 to 40 parts by weight; the graft copolymers according to component (c) are present in amounts from 10 to 63 parts by weight, preferably from 15 to 45 parts by weight; and the sum of the parts by weight of components (a), (b) and (c) is preferably 100 in each case.

Polycarbonates according to component (a) which are suitable according to the invention are homopolycarbonates and copolycarbonates which are based on, for example, one or more of the following diphenols:
Hydroquinone
Resorcinol
Dihydroxydiphenyls
Bis-(hydroxyphenyl)-alkanes
Bis-(hydroxyphenyl)-cycloalkanes Bis-(hydroxyphenyl) sulphides
Bis-(hydroxyphenyl) ethers
Bis-(hydroxyphenyl) ketones
Bis-(hydroxyphenyl) sulphoxides
Bis-(hydroxyphenyl) sulphones and
α,α-Bis-(hydroxyphenyl)-diisopropyl-benzenes
and compounds thereof which are halogenated in the nucleus. These and further suitable diphenols are described, for example, in the U.S. Pat. Nos. 3,028,365, 2,999,835, 3,148,172, 2,991,273, 3,271,367 and 2,999,846, and in the monograph "H. Schnell, Chemistry and Physics of Polycarbonates, Interscience Publishers, New York, 1964".

Preferred diphenols are those of the formula I

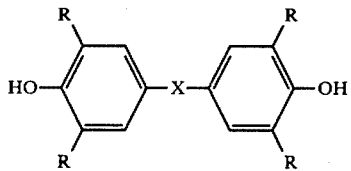

in which
R is identical or different and denotes H, Cl or Br
and in which
X is a bond, $C_1$–$C_8$-alkylene, $C_2$–$C_8$-alkylidene, $C_5$–$C_{15}$-cycloalkylene, $C_5$–$C_{15}$-cycloalkylidene, —$SO_2$— or

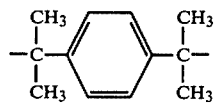

Examples of these diphenols are:
4,4'-dihydroxydiphenyl
2,2-bis-(4-hydroxyphenyl)-propane
2,4-bis-(4-hydroxyphenyl)-2-methylbutane
1,1-bis-(4-hydroxyphenyl)-cyclohexane
β,β-bis-(4-hydroxyphenyl)-p-diisopropylbenzene
2,2-bis-(3-chloro-4-hydroxyphenyl)-propane
2,2-bis-(3,5-dichloro-4-hydroxyphenyl)-propane and
2,2-bis-(3,5-dibromo-4-hydroxyphenyl)-propane.

Examples of particularly preferred bisphenols are:
2,2-bis-(4-hydroxyphenol)-propane
2,2-bis-(3,5-dichloro-4-hydroxyphenyl)-propane
2,2-bis-(3,5-dibromo-4-hydroxyphenyl)-propane and
1,1-bis-(4-hydroxyphenyl)-cyclohexane.

Preferred aromatic polycarbonates are those which are based on one or more of the diphenols which have been mentioned as being preferred. Particularly preferred copolycarbonates are those which are based on 2,2-bis-(4-hydroxyphenyl)-propane and one of the bisphenols other than those mentioned as being particularly preferred. Further particularly preferred polycarbonates are those based on 2,2-bis-(4-hydroxyphenyl)-propane alone.

The aromatic polycarbonates can be prepared according to known processes, for example from diphenols and diphenyl carbonate by the melt transesterification process, and from diphenols and phosgene by the two-phase boundary process, as described in the above-mentioned literature.

The aromatic high molecular weight polycarbonates can be branched by incorporating small amounts, preferably amounts between 0.05 and 2.0 mol % (relative to the diphenols employed), of trifunctional compounds or compounds which are more than trifunctional, in particular those having three or more phenolic hydroxyl groups.

Polycarbonates of this type are described, for example, in the German Offenlegungsschriften (German Published Specifications) Nos. 1,570,533, 1,595,762, 2,116,974, 2,113,347 and 2,500,092, British Patent Specification No. 1,079,821 and U.S. Pat. No. 3,544,514.

Examples of some of the compounds which can be used and which have three or more than three phenolic hydroxyl groups are phloroglucinol, 4,6-dimethyl-2,4,6-tri-(4-hydroxyphenyl)-heptane, 1,4,5-tri-(4-hydroxyphenyl)-benzene, 1,1,1-tri-(4-hydroxyphenyl)-ethane, 2,4-bis-(4-hydroxyphenyl-isopropyl)-phenol, 2,6-bis-(2'-hydroxy-5'-methyl-benzyl)-4-methylphenol, hexa-(4-(4-hydroxyphenylisopropyl)-phenyl)-ortho-terephthalic acid esters, tetra-(4-hydroxyphenyl)-methane and 1,4-bis-(4',4''-dihydroxytriphenyl)-methyl)-benzene. Some of the other trifunctional compounds are 2,4-dihydroxybenzoic acid, trimesic acid, cyanuric chloride and 3,3-bis-(4-hydroxy-3-methyl-phenyl)-2-oxo-2,3-dihydroindole.

$C_1$–$C_4$-alkyl methacrylate polymers according to component (b) which are suitable according to the invention are known polymers of methyl, ethyl, propyl and butyl methacrylates, preferably of methyl and ethyl methacrylate. These are understood as being both homopolymers and copolymers of these methacrylates. In addition, up to a maximum of 9.5% by weight of other ethylenically un-saturated, copolymerisable monomers, in each case relative to the total weight of these unsaturated monomers and methacrylates of component (b), can be copolymerised, so that the $C_1$–$C_4$-alkyl methacrylate polymers (b) which are suitable according to the invention are composed of 90.5% by weight to 100% by weight of alkyl methacrylate units and of 9.5% by weight to 0% by weight of other ethylenically unsaturated monomer units.

Examples of other ethylenically unsaturated copolymerisable monomers are (meth)acrylonitrile, (α-methyl)styrene, bromostyrene, vinyl acetate, $C_1$–$C_8$-alkyl acrylates, aryl (meth)acrylates, (meth)acrylic acid, ethylene, propylene, N-vinylpyrrolidone, vinylsulphonic acid (salts) or styrenesulphonic acid (salts).

The polymers (b) which are suitable according to the invention represent substances soluble in certain organic solvents, and hence possess a linear or branched structure; gel-containing polymers, that is to say those having crosslinked structures, are not polymers (b) in the context of the invention.

The polymers (b) can be prepared according to known polymerisation processes, but preferably by free-radical or thermal polymerisation. Suitable polymerisation processes are those in emulsion, bulk, suspension, dispersion, in particular emulsion polymerisation, but preferably bulk or solution polymerisation. The molecular weights of the polymers (b) can be varied within wide ranges by means of known process-dependent measures, for example by using mercaptans as regulators. The polymers (b) which can be employed according to the invention customarily possess molecular weights (or Staudinger indices or melt viscosities) such that they are suitable for processing by thermoplastic injection moulding or extrusion.

Particulate graft polymers according to component (c) which are suitable according to the invention are prepared by grafting methyl methacrylate, if appropriate in combinations with up to 9.5% by weight of other ethylenically unsaturated, copolymerisable monomers, relative to the total weight of the graft monomers consisting of methyl methacrylate and these other monomers, onto a particulate crosslinked alkyl acrylate rubber, it being possible for the weight ratios of graft monomers (100 to 90.5% by weight of methyl methacrylates+0 to 9.5% by weight of these other monomers):alkyl acrylate rubber base to be between 20% by weight:80% by weight and 80% by weight:20% by weight, preferably between 40% by weight:60% by weight and 60% by weight:40% by weight.

The other, ethylenically unsaturated copolymerisable graft monomers under discussion, for the preparation of the graft polymers according to component (c), are those which have already been mentioned for the preparation of component (b), and are preferably styrene, acrylonitrile, α-methylstyrene, vinyl acetate, alkyl acrylates and aryl (meth)acrylates. Butyl methacrylate, ethyl methacrylate, butyl acrylate and phenyl methacrylate may be mentioned as examples.

The particulate, crosslinked alkyl acrylate rubbers which were used as the rubber grafting base for the preparation of the graft polymers of component (c) are particulate, crosslinked homopolymers of a $C_1$-8-alkyl acrylate, for example ethyl, octyl, 2-ethylhexyl, methyl, butyl or hexyl acrylate, or of a corresponding copolymer with up to 40% by weight of other vinyl monomers, such as styrene, acrylonitrile, methyl methacrylate or vinyl esters. The $C_1$-$C_8$-alkyl acrylates can also be employed as mixtures with one another for the preparation of the alkyl acrylate rubber, and the rubbers can thus also be copolymers of various alkyl acrylates.

To crosslink the acrylate rubber, polyfunctional monomers are copolymerised. These monomers which are to be used according to the invention are in particular cyclic compounds which possess at least 3 equally rapidly polymerising ethylenically unsaturated groups. Triallyl cyanurate, triallyl isocyanurate, trivinyl cyanurates, triallylbenzenes, trivinylbenzenes and 1,3,5-triacryloylhexahydro-s-triazine are preferred, and nitrogen-containing monomers, such as, for example, triallyl cyanurate and triallyl isocyanurate, are particularly preferred.

The amount of crosslinking monomers in the acrylate rubber is relatively low and is 0.05% by weight to 0.99% by weight, in particular 0.1% by weight to 0.6% by weight, relative to the total weight of the crosslinked acrylate rubber. The rubber consists of particules having a mean particle diameter $>0.3\mu$, preferably $>0.45\mu$, and has a gel content of at least 65% by weight, preferably at least 75% by weight (measured in tetrahydrofuran at 25° C.). Particulate, crosslinked alkyl acrylate rubbers of this type are known. [To determine the gel content and the particle sizes see M. Hoffman, H. Krömer and R. Kuhn, Polymeranalytik (Polymer Analysis) I and II, Georg Thieme Verlag, Stuttgart, 1977]. The particulate, crosslinked alkyl acrylate rubbers to be used according to the invention have a glass transition temperature of $\leq 0°$ C., in particular $\leq -20°$ C.

Crosslinked alkyl acrylate rubbers of this type are preferably prepared in emulsion, and are obtained, for example, as a latex which is then employed in a known manner for graft polymerisation with methyl methacrylate and, if appropriate, with the other, ethylenically unsaturated copolymerisable graft monomers.

Preferred particulate graft polymers according to component (c) which are to be used according to the invention are those which contain a highly crosslinked diene rubber as a core inside the crosslinked alkyl acrylate rubber; hence the alkyl acrylate rubber is the first shell, onto which is grafted, as a second shell, the above polymer which has already been described for component (c) and which is prepared by graft polymerisation of methyl methacrylate, if appropriate in combination with up to 9.5% by weight of other, ethylenically unsaturated copolymerisable monomers. The sum of the graft monomers thus again comprises 100 to 90.5% by weight of methyl methacrylate and 0 to 9,5 5 by weight of other, ethylenically unsaturated, copolymerisable monomers.

The mean particle diameter of the diene rubber is $>0.08\mu$, in particular $0.1-0.2\mu$, and when the alkyl acrylate rubber shell is included, the mean particle diameter is $>0.3\mu$, in particular $>0.45\mu$.

The weight ratio of the diene rubber core in graft polymer (c) to the first shell in graft polymer (c) is from 0.1:99.9 to 10:90, preferably 0.2:99.8 to 5:95; the proportion of the second shell in the total graft polymer (c) can be from 30% by weight to 70% by weight, preferably from 40% by weight to 60% by weight. The graft polymers (c) have mean particle diameters of $>0.3\mu$, preferably $>0.45\mu$. Particularly preferred particle diameters are $>0.5\mu$ (determined by light scattering).

The material of the diene rubber core is either a crosslinked rubber obtained from one or more conjugated dienes, such as butadiene, or a crosslinked copolymer of a conjugated diene with an ethylenically unsaturated monomer, such as styrene and/or acrylonitrile. The cross-linking is effected by free radicals during the preparation of the diene rubber core, for example by emulsion polymerisation of diene-containing monomers or mixtures at relatively high temperatures and at high eonomer conversions, if appropriate in the presence of polyfunctional vinyl monomers, such as divinylbenzene, or if appropriate by means of the subsequent action of a peroxide.

Products of this type are known (see, for example, German Pat. No. 3,022,469 and European Pat. No. 34,748), and can be characterised by, for example, determination of the gel content, light-scattering methods, elementary analyses and electron spectroscopy.

The acrylate rubber shell is a crosslinked acrylic rubber as already described above in connection with component (c). In addition to the $C_1$-$C_8$-alkyl acrylates mentioned there, halogenoalkyl acrylates, preferably $C_1$-$C_8$-halogenalkyl acrylates, such as chloroethyl acrylate, and also araliphatic acrylates, such as benzyl acrylate and phenethyl acrylate are also suitable. They can be employed individually or as a mixture, and at least one alkyl acrylate should be present in the mixture. Examples of the other vinyl monomers which are to be concomitantly used in amounts of up to 40% by weight are styrene, acrylonitrile, methyl methacrylate and vinyl esters, which have already been listed above for the preparation of the alkyl acrylate rubbers for the preparation of component (c).

Any desired polyfunctional monomers can be copolymerised to crosslink the acrylate rubber shell.

In addition to the crosslinking agents already mentioned for the crosslinking of the alkyl acrylate rubbers, other examples are esters of unsaturated carboxylic acids of $C_2$-$C_{20}$-polyols, such as, for example, ethylene glycol dimethacrylate, esters of polybasic carboxylic acids with unsaturated alcohols, preferably with unsaturated $C_3$-$C_{12}$-alcohols, such as, for example, triallyl cyanurate or triallyl isocyanurate, divinyl compounds, such as, for example, divinylbenzene, esters of unsaturated carboxylic acids with unsaturated alcohols, preferably with unsaturated $C_3$–$C_{12}$-alcohols, such as, for example, allyl methacrylate, phosphates, such as, for example, triallyl phosphate, and 1,3,5-triacryloylhexahydro-s-triazine.

Particularly preferred polyfunctional monomers are triallyl cyanurate, triallyl isocyanurate, triallyl phosphate, allyl methacrylate, ethylene glycol dimethacrylate and 1,3,5-triacryloylhexahydro-s-triazine.

The amount of polyfunctional monomers used for crosslinking is preferably 0.05 to 10% by weight, in particular 0.1 to 5.0% by weight, of the total weight of the crosslinked alkyl acrylate rubber shell.

The second shell consists of polymerised methyl methacrylate, if appropriate as a mixture with up to 9.5% by weight of copolymerised other ethylenically unsaturated monomers, preferably styrene, acrylonitrile, α-methylstyrene, vinyl acetate, alkyl acrylate and/or aryl (meth)acrylates, as described for the preparation of the graft polymers according to component (c).

Thus, once again, 100% by weight to 90.5% by weight of methyl methacrylate and 0% by weight to 9.5% by weight of these other, ethylenically unsaturated, copolymerisable monomers, relative to the total weight of these graft monomers, are suitable for the formation of the second shell.

These known, particulate graft copolymers according to component (c) which according to the invention are preferably to be used can be prepared, for example in aqueous emulsion, as follows: first, the diene rubber for the core (1) is prepared in latex form by emulsion polymerisation of a conjugated diene, and, for example, is simultaneously at least partially crosslinked. The polymerisation is known. The acrylate rubber for the first shell is then prepared in the presence of the diene rubber latex, likewise in aqueous emulsion, by emulsifying the monomers (main constituent at least one alkyl acrylate) in the latex, and polymerising them in a known manner over free-radical forming initiators. The acrylate rubber polymerises with at least partial grafting onto the diene rubber. By the concomitant use of polyfunctional monomers, it can be crosslinked even during the preparation.

In this graft polymerisation of the first shell (2), the formation of new particles has to be suppressed as completely as possible. An emulsion stabiliser must be present in an amount required to cover the surface of the particles. The size of these particles can be varied within wide limits by varying the way in which the reaction is carried out. If an agglomerated latex is used as the core (1) in order to obtain large particles, these can contain several diene rubber particles. The polymerisation of the first shell (2) can also be carried out so that particles with a diene rubber core and particles of pure, crosslinked acrylate rubber are produced simultaneously. Such mixtures, also, can be used in certain circumstances for the preparation of impact-resistant moulding compositions.

After completion of the graft polymerisation of the acrylate rubber, methyl methacrylate, if appropriate as a mixture with the vinyl monomer already mentioned for the synthesis of the second shell (3), is polymerised, in emulsion, onto the latex obtained. In this process, graft polymers are formed, producing the second shell (3). In this graft polymerisation which is in itself known and which is customarily carried out in the presence of free-radical initiators, for example water-soluble initiators, emulsifiers or complex-formers/grafting activators, and regulators, a certain amount of free polymers or copolymers of the monomers which form the second shell (3) is in general formed, in addition to the graft polymer. The amount of this non-grafted polymer can be characterised by the degree of grafting or the grafting yield, and depends, inter alia, on the polymerisation conditions, the composition of the first shell (2), the size of the particles to be grafted, and the amount of grafted acrylate rubber. For the purposes of the invention, "graft polymer" according to component (c) is therefore the product obtained by polymerisation of vinyl monomers in the presence of the rubber latex, and at least part of the graft monomers should be grafted on by chemical reaction.

The graft polymers (c) prepared in this manner can be worked up according to known processes, for example by coagulation of graft copolymer latices with acids, salts or organic solvents, by spray-drying, and by the action of heat, cold or shearing forces. After the polymers have subsequently been dried, they are obtained as pulverulent substances.

The individual components (a), (b) and (c) can be compounded to give the moulding compositions according to the invention by means of screw extruders (for example twin-screw extruders) or kneading units; this procedure can be carried out, for example, by compounding all three components simultaneously, or by compounding one of the components (for example the polycarbonate) with a precompound of the other two components; thus, a powder mixture of components (b) and (c) is also designated as precompound. After compounding to give the moulding composition (for example in the form of granules), these granules can be processed, for example by injection moulding or extrusion processes, to produce the most diverse mouldings. Mouldings of this type are used in particular where dimensional stability under heat, toughness and good ageing behaviour are required, that is to say, where the use hitherto of polycarbonate-polymethacrylate mixtures or of polycarbonate-ABS polymer mixtures is as yet not completey satisfactory.

If required, the moulding compositions according to the invention also contain antioxidants, lubricants, pigments, dyestuffs, separating agents, UV stabilisers, thermostabilisers, for polycarbonates, etc.

The moulding compositions according to the invention possess an extraordinary stability to the most diverse ageing processes; such stabilities are not achieved, for example, in known systems of polycarbonates and ABS polymers.

For fields of use in which the ageing resistance required is not extreme but only average, but must still be better than that of the systems comprising polycarbonate+ABS polymers, it is also possible to extend the moulding compositions according to the invention by the addition of thermoplastic ABS polymers or of thermoplastic SAN resins.

The present invention thus also relates to thermoplastic moulding compositions based on thermoplastic ABS resins or thermoplastic SAN resins which contain at least 60% by weight of the three-component mixture according to the invention, which mixture consists of the components (a)+(b)+(c).

EXAMPLES

I. Instructions for the preparation of the polycarbonate (a) used

Approx. 454 parts of 4,4'-dihydroxyphenyl-2,2-propane and 9.5 parts of p-tert.-butylphenyl are suspended in 1.5 liters of water. In a 3-necked flask equipped with a stirrer and a gas inlet tube, the oxygen is removed from the reaction mixture by passing nitrogen through the reaction mixture for 15 minutes, while stirring. 355 parts of 45% strength sodium hydroxide solution and 1,000 parts of methylene chloride are then added. The mixture is cooled to 25° C. While maintaining this temperature by cooling, 237 parts of phosgene are added during a period of 120 minutes. An additional amount of 75 parts of 45% strength sodium hydroxide solution is added after 15–30 minutes, or after the absorption of phosgene has begun. 1.6 parts of triethyleneamine are added to the resulting solution, and the mixture is stirred for a further 15 minutes. A highly viscous solution is obtained, the viscosity of which is regulated by the addition of methylene chloride. The aqueous phase is separated off. The organic phase is washed salt-free and alkali-free with water. The polycarbonate is isolated from the washed solution, and dried. The polycarbonate has a relative viscosity of 1.29–1.30, measured in a solution of 0,5 g in 100 ml methylene chloride at 20° C. This corresponds approximately to a molecular weight of 32,000. The polycarbonate obtained in this manner is extruded and granulated.

II. Instructions for the preparation of the graft copolymer (c) used

1. In a reactor, the following emulsion is polymerised in the course of 22 hours at 65° C., while stirring, until virtually complete monomer conversion takes place:
90 parts by weight of butadiene
19 parts by weight of styrene
1.8 parts by weight of the Na salt of disproportionated abietic acid
0.257 acid by weight of sodium hydroxide
0.3 part by weight of n-dodecylmercaptan
1.029 parts by weight of Na ethylenediamine tetraacetate.
0.023 part by weight of potassium persulphate
176 parts by weight of water A latex is obtained which contains, in a concentration of approx. 35 to 36%, butadiene/styrene copolymer particles having a mean diameter of 0.1μ.

2. Preparation of acrylate rubber particles which contain polydiene cores (core (1) with shell (2))

The following mixture is initially introduced into a reactor at 65° C., while stirring:
45 parts by weight of the latex (1)
2,800 parts by weight of water
8 parts by weight of potassium persulphate The following mixtures are metered separately into the reactor at 65° C. in the course of 5 hours:
Mixture A:
3,013 parts by weight of n-butyl acrylate
6 parts by weight of triallyl cyanurate
Mixture B:
2,134 parts by weight of water
41 parts of by weight of Na sulphate of C 14-C 18 hydrocarbons.

The mixture is then left for 4 hours at 65° C. to complete polymerisation. The polymers formed possess gel contents of 80 to 88% by weight and mean particles diameters of 0.55μ; the latex has a polymer solids content of 37.7%. The glass transition temperature is −55° C., determined by modulus/temperature measurements.

3. Preparation of a graft copolymer

The following mixture is initially introduced into a reactor at 65° C.:
4,400 parts by weight of the latex (2)
720 parts by weight of water
5 parts by weight of potassium persulphate The following feeds are metered in separately at 70° C. in the course of 4 hours:
Feed 1:
1,100 parts by weight of methyl methacrylate
Feed 2:
1,430 parts by weight of water
16 parts by weight of Na sulphonate of C 14-C 18 hydrocarbons The mixture is then stirred for a further 4 hours at 70° C. The completely polymerised latex is 36% strength in respect of polymer solids.

The resulting latex of the graft copolymer comprising 60 parts of rubber and 40 parts of methyl methacrylate is isolated by coagulation with magnesium sulphate solution, and dried.

III. The polymer (b) used

In the particular case, a bulk-polymerised methyl methacrylate polymer with a melt index MFI (230/3.8) of approx. 6.0 (g/10 min.) (DIN 53,735) was employed. The preparation of such products is known; they can be obtained commercially.

V. Products for comparative examples (1) For comparison, an SAN resin with an acrylonitrile content of 28% by weight and a Staudinger index $[\eta]_{DMF}$ (at 25° C.) of 0.80 was employed as polymer (b).

(2) In addition, the two components (b) and (c) were replaced by an ABS resin with a rubber content of 30% by weight.

(3) An ABS polymer with a rubber content of 50% by weight was employed.

IV. Preparation and properties of the moulding compositions

The following components, in the number of parts by weight given, are compounded in a compounding kneader, at a temperature of 240° C.:

| Mixture | Polycarbonate I Parts by weight | Graft polymer II[3] Parts by weight | Polymer III Parts by weight | Polymer IV[1] Parts by weight | Polymer IV[2] Parts by weight | Polymer IV[3] Parts by weight |
|---|---|---|---|---|---|---|
| 1 | 60 | 20 | 20 | — | — | — |
| 2 | 60 | 20 | — | 20 | — | — |
| 3 | 60 | — | — | — | 40 | — |
| 4 | 60 | — | 16 | — | — | 24 |

| Mechanical properties Mixture | 1 | 2 | 3 | 4 |
|---|---|---|---|---|
| Notched impact strength (23° C.) for a mass temperature during injection | | | | |

-continued

| Mechanical properties Mixture | 1 | 2 | 3 | 4 |
|---|---|---|---|---|
| moulding of 260° C. (kJ/m²) | 36 | 36 | 39 | 32 |
| and 300° C. (kJ/m²) according to DIN 53,453 | 34 | 21 | 16 | 7 |
| Tensile strength according to DIN 53,455 (Mpa) | 65 | 50 | 46 | — |
| Elongation at break, according to DIN 53,455 (%) | 99 | 101 | 71 | — |
| Tensile modulus of elasticity according to DIN 53,455 (Mpa) | 2,159 | 2,969 | 2,219 | — |
| Impact strength (23° C.) according to DIN 53,454 (kJ/m²) | not measured | not measured | not measured | — |
| Vicat B temperature according to DIN 53,460 (°C.) | 123 | 119 | 120 | — |

As is evident from the above table, the mechanical properties of all the compounds prepared are almost identical, with the exception of the notched impact strength values of mouldings which were prepared at a mass temperature of 300° C., by injection moulding: the compound 1 (mixture 1) according to the invention has in this case a substantially higher notched impact strength than other mixtures which contain proportions of SAN resin or ABS polymer; the polymethmethacrylate mixture 4, in combination with the ABS graft polymer IV 3), also has very low notched impact strength (approx. 7 kJ/m²).

The mouldings produced at a mass temperature of 260° C. were additionally subjected to thermal ageing at 110° C. (storage at 110° C.; the mechanical properties of the test samples are given as a function of the storage time):

| Mixture | 1 | | | | 2 | | | | 3 | | | |
|---|---|---|---|---|---|---|---|---|---|---|---|---|
| Storage time (hours) | 0 | 100 | 400 | 800 | 0 | 100 | 400 | 800 | 0 | 100 | 400 | 800 |
| Tensile strength (MPa) | 65 | — | 57 | — | 50 | — | 49 | — | 46 | — | 48 | — |
| Elongation at break (%) | 99 | — | 43 | — | 101 | — | 16 | — | 71 | — | 16 | — |
| Notched impact strength | 36 | 32 | 31 | 28 | 36 | 29 | 22 | 20 | 39 | 22 | 20 | 15 |

As demonstrated by the above summary, mixture 1 possesses a substantially better thermostability (notched impact strength as a function of the storage temperature) than the other mixtures. This improved ageing behaviour is also evident from the more gentle fall-off in the elongation at break.

We claim:

1. Mixtures comprising
   (a) homopolycarbonates and copolycarbonates which are based on one or more diphenols selected from hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones, α,α-bis-(hydroxyphenyl)-diisopropyl-benzenes, and compounds thereof which are halogenated in the nucleus, said polycarbonate having a weight average molecular weight of 10,000 to 200,000;
   (b) thermoplastic polymers of $C_1$ to $C_4$-alkyl methacrylates having a weight average molecular weight of 10,000 to 1,000,000 measured in dimethylformamide at 25° C.;
   (c) particulate graft polymers of methyl methacrylate onto a particulate, highly crosslinked alkyl acrylate rubber wherein the weight ratio of grafted monomers:alkylate rubber base is between 20:80 and 80:20;
   characterized in that component (a) is present in amounts of 75 to 45 parts by weight, component (b) is present in amounts from 10 to 40 parts by weight and component (c) is present in amounts from 15 to 45 parts by weight, with the proviso that the sum of (a), (b) and (c) parts is 100 parts.

2. Mixtures according to claim 1 characterised in that the particulate graft polymers (c) are prepared by polymerisation of 100 to 90.5% by weight of methyl methacrylate and 0 to 9.5% by weight of other, ethylenically unsaturated copolymerisable monomers, relative to the total weight of grafted monomers.

3. Mixtures according to claim 1 wherein component (c) further contains a crosslinked diene rubber as an inner core of the alkyl acrylate rubber.

4. Mixtures according to claim 3, characterised in that the weight ratio of the diene rubber core to the acrylate rubber shell is from 0.1:99.9 to 10:90, and the proportion of the second shell in the total graft polymer (c) can be from 30% by weight to 70% by weight.

5. Thermoplastic moulding compositions based on thermoplastic ABS resins or thermoplastic SAN resins, characterised in that they contain at least 60% by weight of the mixtures from claim 1.

6. Mixtures according to claim 1 wherein the diphenol on which the polycarbonate of component (a) is of the formula

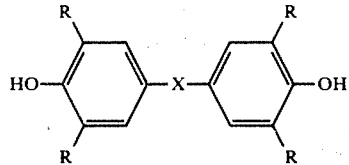

wherein each R is identical or different and is H, chloro or bromo and wherein X is a covalent bond, alkylene having 1 to 8 carbon atoms, alkylidene having 2 to 8 carbon atoms, cycloalkylene having 5 to 15 carbon atoms, cycloalkylidene having 5 to 15 carbon atoms, —$SO_2$— or

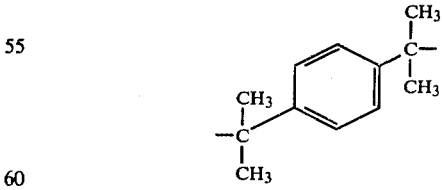

7. Mixtures according to claims 1 or 6 wherein component (b) is a copolymer or homopolymer of methyl methacrylate and ethyl methacrylate.

8. Mixtures according to claims 1 or 6 wherein the weight ratio of grafted monomers:alkylate rubber base in component (c) is between 40:60 and 60:40.

* * * * *